(12) United States Patent
Warburton-Pitt

(10) Patent No.: US 6,432,345 B1
(45) Date of Patent: Aug. 13, 2002

(54) SINGLE-STEP METHOD OF MANUFACTURING A SILICONE TUBE MANIFOLD

(75) Inventor: Stephen Warburton-Pitt, Andover, NJ (US)

(73) Assignee: Truseal USA, Inc., Andover, NJ (US)

( * ) Notice: Subject to any disclaimer, the term of this patent is extended or adjusted under 35 U.S.C. 154(b) by 0 days.

(21) Appl. No.: 09/473,425

(22) Filed: Dec. 29, 1999

(51) Int. Cl.⁷ .......................... B29C 45/14; B29C 70/72
(52) U.S. Cl. .................. 264/263; 264/277; 285/133.11
(58) Field of Search .............................. 264/263, 275, 264/277, 255; 137/594; 285/133.11, 125.1

(56) References Cited

U.S. PATENT DOCUMENTS

| | | | |
|---|---|---|---|
| 2,409,283 A | 10/1946 | Hudson | 285/115 |
| 3,022,209 A | 2/1962 | Campbell | 156/158 |
| 3,643,805 A * | 2/1972 | Hoffman | 264/261 |
| 3,683,960 A * | 8/1972 | Kirsch | 264/277 |
| 3,961,010 A * | 6/1976 | Holmes | 264/261 |
| 4,070,044 A | 1/1978 | Carrow | 285/156 |
| 4,312,687 A * | 1/1982 | Sigworth, Jr. | 264/263 |
| 4,615,114 A * | 10/1986 | Jones et al. | 29/858 |
| 5,049,224 A * | 9/1991 | Umezawa et al. | 156/294 |
| 5,266,262 A * | 11/1993 | Narayama et al. | 264/277 |
| 5,335,944 A | 8/1994 | Mitsui et al. | 285/156 |
| 5,411,300 A | 5/1995 | Mitsui | 285/292 |
| 5,447,341 A | 9/1995 | Hartel et al. | 285/238 |
| 5,568,949 A | 10/1996 | Andre | 285/284 |
| 5,895,695 A | 4/1999 | Rowley | 428/36.9 |
| 6,180,038 B1 * | 1/2001 | Cesaroni | 264/277 |

\* cited by examiner

*Primary Examiner*—Angela Ortiz
(74) *Attorney, Agent, or Firm*—David L. Davis

(57) ABSTRACT

A method for forming, in a single step, a silicone manifold interconnecting a plurality of silicone tubes is performed by providing a silicone insert piece having a network of interior channels dimensioned the same as the silicone tube interiors. Solid non-silicone plugs are inserted into the insert piece and the ends of the silicone tubes and the resulting assembly is placed in a mold cavity. Liquid silicone is added to the mold cavity and is then heated and cured to form the desired manifold interconnecting the tubes. The manifold is then removed from the mold and a source of pressurized air is used to blow out the plugs.

7 Claims, 4 Drawing Sheets

SINGLE-STEP METHOD OF MANUFACTURING A SILICONE TUBE MANIFOLD

BACKGROUND OF THE INVENTION

This invention relates to the interconnection of hollow silicone tubes and, more particularly, to a method for forming in a single step a silicone manifold interconnecting a plurality of silicone tubes.

Since silicone is a relatively inert chemical in aqueous solutions, i.e., it does not react with contacting liquids or leach chemicals into contacting liquids, it is a material that has obvious advantages for use in many applications, including pharmaceutical manufacture and intravenous drug delivery. Oftentimes, an assembly of interconnected silicone tubes is required. Thus, there exists a need for forming a manifold interconnecting a plurality of silicone tubes. In the past, such manufacturing has been done in a two step process where a first part of the mold was utilized, then an insert was removed, and then the remainder of the mold was utilized. It would be preferable, however, to have a single step process for forming a manifold interconnecting a plurality of silicone tubes.

SUMMARY OF THE INVENTION

According to the present invention, a single step process for forming a silicone manifold interconnecting a plurality of silicone tubes comprises the steps of providing a plurality of hollow silicone tubes, providing a silicone insert piece consisting of a body having a plurality of ports equal in number to the plurality of silicone tubes to be interconnected and at least one interior channel interconnecting all of the ports and defining a plurality of port openings communicating with the exterior of the piece at each of the ports, and providing a plurality of solid non-silicone plugs. The plugs are used to connect each of the tubes with a respective port opening to form an assembly. A mold having a cavity shaped as the desired manifold is provided and the assembly is inserted into the mold cavity. The mold cavity is then filled with liquid silicone, which is heated and cured to form a manifold. The manifold is removed from the mold cavity and the plurality of plugs is then removed from the manifold.

In accordance with an aspect of this invention, the step of removing the plurality of plugs includes the step of providing a source of pressurized air.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
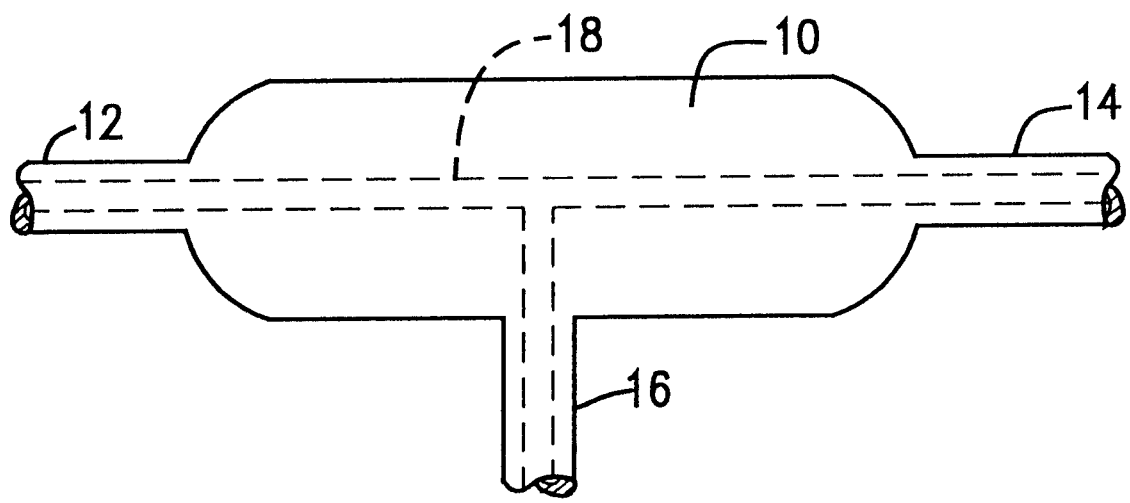
FIG. 1 is a plan view of a silicone manifold interconnecting a plurality of silicone tubes which is formed in accordance with the present invention.

FIG. 1 show s a silicone manifold 10 interconnecting a plurality of hollow silicone tubes 12, 14, 16. As shown, the interiors of the tubes 12, 14, 16 are interconnected by a network of interior channels 18, illustratively having a T-shape, within the body of the manifold 10. Illustratively, all of the interior channels have a circular cross section.

Figure 2:
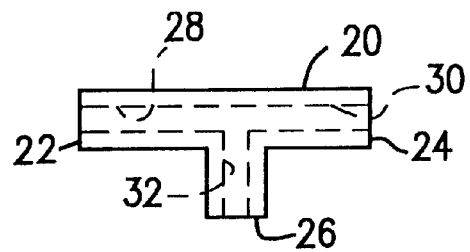
FIG. 2 is a plan view showing an illustrative silicone insert piece used in the inventive method.
Figure 5:
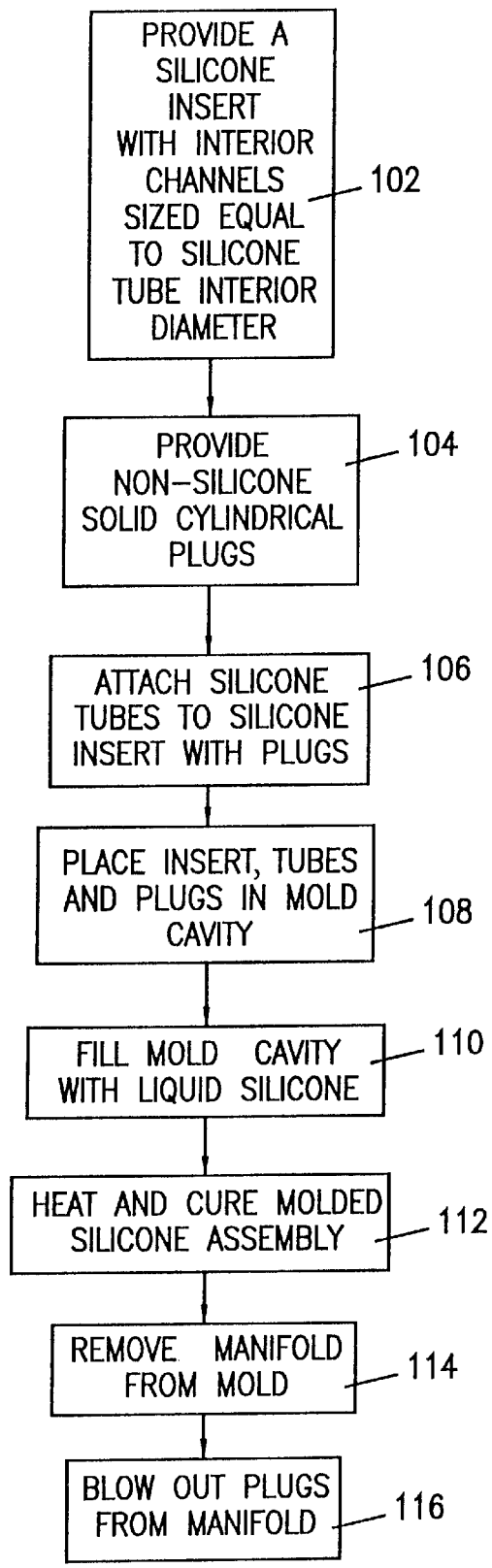
FIG. 5 is a flow chart showing the steps for forming the manifold of FIG. 1 in accordance with the present invention.

To produce the manifold shown in FIG. 1, the insert piece 20 shown in FIG. 2 is provided. The insert piece 20 is a T-shaped piece of silicone, wherein each of its legs has a circular cross section, and having three ports 22, 24, 26 equal in number to the three tubes 12, 14, 16 that are to be interconnected. The piece 20 further has interior channels 28, 30, 32 interconnecting all of the ports 22, 24, 26 and defining a plurality of port openings communicating with the exterior of the piece 20 at each of the ports 22, 24, 26. The channels 28, 30, 32 all have a circular cross section with a diameter equal to the interior diameter of the tubes 12, 14, 16. As shown in FIG. 5, this is the step 102.

According to the step 104 (FIG. 5), three non-silicone solid cylindrical plugs 34, 36, 38 are provided. The plugs 34, 36, 38 have a smooth outer surface and fit snugly within the interior channels 28, 30, 32 of the insert piece 20, as well as the interior of the tubes 12, 14, 16. As shown in step 106 (FIG. 5), and in FIG. 3, an assembly is formed by inserting each of the plugs 34, 36, 38 into a respective one of the tubes 12, 14, 16 and into a respective port opening of the insert piece 20.

Figure 3:
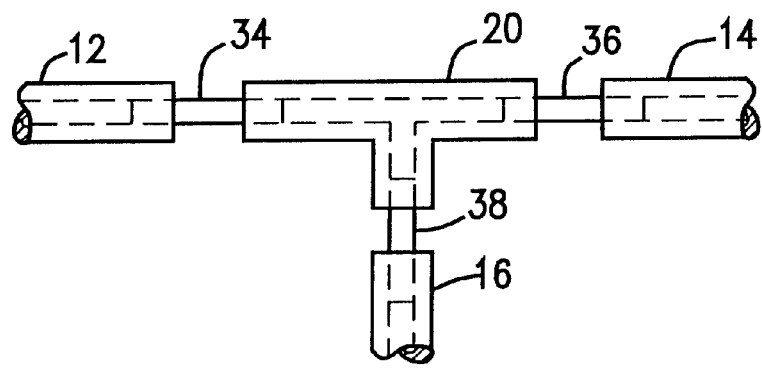
FIG. 3 is a plan view showing the formation of an assembly including the insert piece of FIG. 2 and three silicone tubes.
Figure 4:
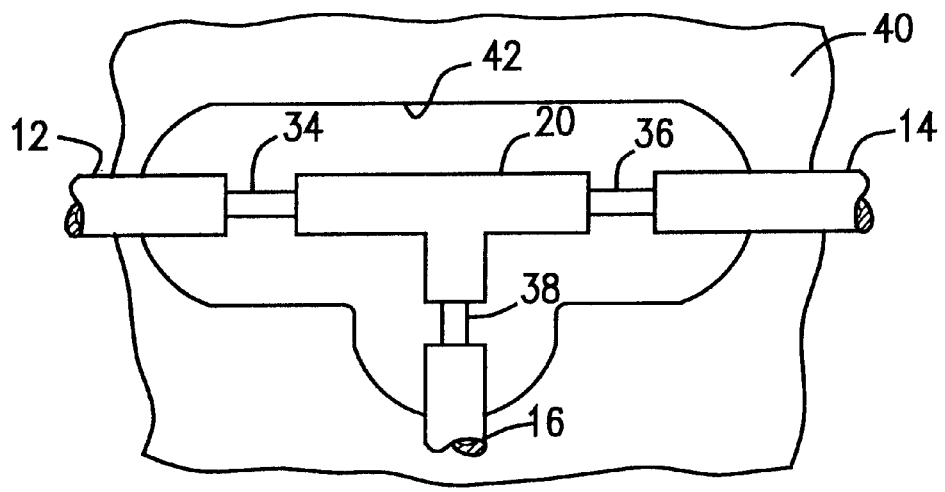
FIG. 4 is a plan view showing placement of the assembly of FIG. 3 in a mold cavity for forming the manifold of FIG. 1.

A mold 40 having a cavity 42 shaped as the desired manifold 10 (FIG. 1) is provided. The assembly of FIG. 3 is then placed in the mold cavity 42, as shown in FIG. 4 and by the step 108 (FIG. 5). As shown by the steps 110 and 112, the mold cavity 42 is filled with liquid silicone, which is then heated and cured. The added liquid silicone fuses and integrates with the silicone of the tubes 12, 14, 16 and the silicone of the insert piece 20 to form a unitary manifold, as shown in FIG. 1. This manifold is then removed from the mold 40, as indicated by the step 114 (FIG. 5).

The formed manifold 10 is as shown in FIG. 1 but it still has the plugs 34, 36, 38 in the interior channels 18. Since the plugs 34, 36, 38 are formed of a material other than silicone, they maintain their separate identity and are not integrated with the silicone. These plugs 34, 36, 38 can be removed from the manifold 10 by blowing them out using a source of pressurized air, as indicated by the step 116 (FIG. 5).

Figure 6:
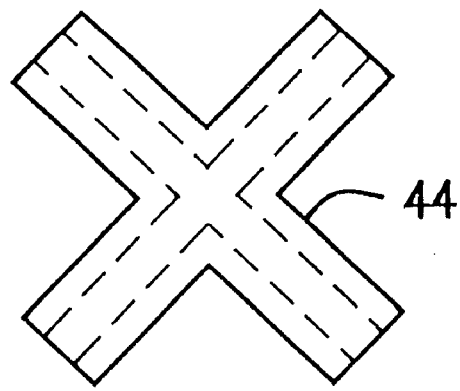
FIG. 6 is a plan view showing a second embodiment of an insert piece.
Figure 7:
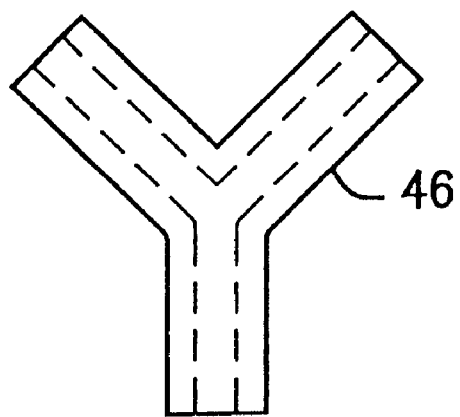
FIG. 7 is a plan view showing a third embodiment of an insert piece.

In the foregoing description, three silicone tubes have been shown as being interconnected via the manifold 10. The present invention can be practiced using other numbers of tubes. In such a case, a different insert piece would be provided. Thus, as shown in FIG. 6, an X-shaped insert piece 44 can be utilized where it is desired to produce a manifold interconnecting four tubes. As shown in FIG. 7, a Y-shaped insert piece 46 can be utilized in place of the T-shaped insert piece 20 for producing a manifold interconnecting three tubes. Further, while the foregoing description has shown a dedicated plug for each pair of an insert piece port opening and a tube, it is understood that a single plug can extend through the insert piece so as to be exposed at two opposed port openings for insertion into two different tubes. Thus, for example, a single elongated plug can take the place of the plugs 34 and 36 (FIG. 3) and extend through both the interior channels 28 and 30 (FIG. 2). Also, a single dogleg-shaped plug can be used in the Y-shaped insert piece 46 (FIG. 7) to extend out of the lower port opening and one of the upper port openings.

Accordingly, there has been described a single-step method for forming a silicone manifold interconnecting a plurality of silicone tubes. While an illustrative embodiment of the inventive method has been disclosed herein, it is understood that various adaptations and modifications to the disclosed method are possible, and it is intended that this invention be limited only by the scope of the appended claims.

What is claimed is:

1. A method for forming a silicone manifold interconnecting a plurality of silicone tubes, the method comprising the steps of:

providing a plurality of hollow silicone tubes;

providing a silicone insert piece consisting of a body having a plurality of parts equal in number to the plurality of silicone tubes to be interconnected and at least one interior channel interconnecting all of the ports and defining a plurality of port openings communicating with the exterior of the piece at each of the ports;

providing a plurality of solid non-silicone plugs;

using said plugs to connect each of said tubes with a respective port opening to form an assembly;

providing a mold having a cavity shaped as a desired manifold;

inserting the assembly into the mold cavity with a portion of each of the tubes extending outwardly from the mold cavity;

filling the mold cavity with liquid silicone;

heating and curing the liquid silicone to form a manifold;

removing the manifold from the mold cavity, and removing the plurality of plugs from the manifold.

2. The method according to claim 1 wherein the step of removing the plurality of plugs includes the step of providing a source of pressurized air.

3. The method according to claim 1 wherein the manifold connects three silicone tubes and the step of providing a silicone insert piece includes the step of providing a T-shaped silicone insert piece.

4. The method according to claim 1 wherein the manifold connects three silicone tubes and the step of providing a silicone insert piece includes the step of providing a Y-shaped silicone insert piece.

5. The method according to claim 1 wherein the manifold connects four silicone tubes and the step of providing a silicone insert piece includes the step of providing an X-shaped silicone insert piece.

6. The method according to claim 1 wherein the step of providing a plurality of plugs includes the step of providing a plurality of smooth cylindrical solid non-silicone plugs.

7. A silicone manifold interconnecting a plurality of silicone tubes, when made in accordance with the method of claim 1.

* * * * *